United States Patent [19]
Lee

[11] Patent Number: 5,892,818
[45] Date of Patent: Apr. 6, 1999

[54] METHOD OF CONTROLLING MESSAGE OVERLOAD ON A PROGRAM IN A PLURAL PROCESSOR CONTROLLED SWITCHING SYSTEM

[75] Inventor: Kwang-Bae Lee, Daegu kwangyeok, Rep. of Korea

[73] Assignee: SamSung Electronics Co., Ltd., Suwon, Rep. of Korea

[21] Appl. No.: 655,125

[22] Filed: May 28, 1996

[30] Foreign Application Priority Data

May 27, 1995 [KR] Rep. of Korea .................. 1995 13573

[51] Int. Cl.⁶ ........................... H04M 15/00; H04M 3/00; H04M 5/00
[52] U.S. Cl. .......................... 379/112; 379/112; 379/113; 379/133; 379/242
[58] Field of Search .................................... 379/220, 265, 379/221, 266, 207, 279, 242, 278, 112, 113, 133

[56] References Cited

U.S. PATENT DOCUMENTS

| | | | |
|---|---|---|---|
| 4,511,762 | 4/1985 | Stockdale | 179/10 |
| 4,626,624 | 12/1986 | Daisenberger | 379/279 |
| 4,626,625 | 12/1986 | Daisenberger | 379/137 |
| 4,658,098 | 4/1987 | Wegmann | 379/113 |
| 4,692,860 | 9/1987 | Andersen | 364/200 |
| 4,737,983 | 4/1988 | Frauenthal et al. | 379/221 |
| 4,931,941 | 6/1990 | Krishnan | 379/220 |
| 4,974,256 | 11/1990 | Cyr et al. | 379/113 |
| 4,984,264 | 1/1991 | Katsube | 379/220 |
| 5,007,043 | 4/1991 | Dool et al. | 370/60 |
| 5,042,064 | 8/1991 | Chung et al. | 379/113 |
| 5,067,074 | 11/1991 | Farel et al. | 395/200 |
| 5,142,570 | 8/1992 | Chaudhary et al. | 379/221 |
| 5,253,288 | 10/1993 | Frey et al. | 379/221 |
| 5,299,259 | 3/1994 | Otto | 379/221 |
| 5,299,260 | 3/1994 | Shaio | 379/266 |
| 5,313,584 | 5/1994 | Tickner et al. | 395/275 |
| 5,384,841 | 1/1995 | Adams et al. | 379/221 |
| 5,390,243 | 2/1995 | Casselman et al. | 379/265 |
| 5,440,741 | 8/1995 | Morales et al. | 395/650 |
| 5,450,483 | 9/1995 | Williams | 379/279 |
| 5,513,185 | 4/1996 | Schmidt | 371/5.5 |
| 5,548,533 | 8/1996 | Gao et al. | 364/514 |

*Primary Examiner*—Krista Zele
*Assistant Examiner*—Benny Q. Tieu
*Attorney, Agent, or Firm*—Robert E. Bushnell, Esq.

[57] ABSTRACT

The present invention relates to a method of controlling a message overload in a program of an electronic switching system having a large capacity controlled by a plurality of processors, and more particularly, to a method of controlling a message overload before a resource is requested to an operating program by the program receiving a plurality of messages. The method receives a function request message after setting a counting value for receiving a message, increases a message counter by one every time the function request message is received and then obtains a counted value by the message counter, compares the counted value with a designated threshold value, performs a corresponding specific function to thereby carry out an added job when the counted value is equal to or less than the designated threshold value, and notifies a processor which requested the specific function of a job result, and informing the corresponding processor which requested the specific function of a process impossibility when the counted value is larger than the designated threshold value, thereby generating an alarm indicating an overload state.

7 Claims, 3 Drawing Sheets

METHOD OF CONTROLLING MESSAGE OVERLOAD ON A PROGRAM IN A PLURAL PROCESSOR CONTROLLED SWITCHING SYSTEM

CROSS REFERENCE TO RELATED APPLICATIONS

This application makes reference to, incorporates the same herein, and claims all benefits accruing under 35 U.S.C §119 from an application entitled A Method Of Controlling Message Overload Of A Unit Program In A Multi Processor Controlling System earlier filed in the Korean Industrial Property Office on, which was duly assigned Ser. No. 13573/1995 by that Office.

BACKGROUND OF THE INVENTION

1. Field of the Invention

The present invention relates to a method of controlling a message overload on a program in a large capacity electronic switching system controlled by a plurality of processors, and more particularly, to a method of controlling a message overload before a resource is requested for an operating program by the program receiving the plurality of messages.

2. Description of the Related Art

In general, functions of an electronic switching system are performed according to plural programs of a multiprocessor. Accordingly, an operating resource may be monopolized by a specific program of the plural programs and therefore, a message overload may be generated.

In a telecommunication system, such as a telephone system, a switching network is connected between plural subscribers through plural subscriber connection processors. The switching network is also connected between plural processors which analyze calls from the subscribers and process the calls or connect the calls to additional service devices. If one of the processors receives a plurality of function requests simultaneously from plural subscribers, a system fault due to an overload on the processor receiving the function requests may be generated.

Overloads are known in the art and have been handled by a number of different methods. One such method contemplates rerouting a call when an overload is detected, such as described by Daniel C. Kerrigan, et al., in U.S. Pat. No. 5,291,552 entitled Distribution of Calls Among Automatic Call Distributers of a Single Large Customer, and by Mary R. Otto in U.S. Pat. No. 5,299,259 entitled Distributing Calls Over Serving Centers of a Large Customer. A problem is incurred when a call can not be rerouted and, as such, the call is lost.

Another method is discussed by Robert Stockdale in U.S. Pat. No. 4,511,762 entitled Overload Detection and Control System for a Telecommunications Exchange wherein detection of system overload is based upon the time for a central processor to send a responsive message to a line/trunk group, and management of this overload is accomplished by the line/trunk group changing between operational levels in response to the measured time.

A further method includes a counter counting steps and comparing a counted value with a threshold value. Such a method is disclosed by: Robert H. Tickner, et al. in U.S. Pat. No. 5,313,5884 entitled Multiple I/O Processor System; Frans van del Dool in U.S. Pat. No. 5,007,043 entitled Method for Transmitting, Via a Plurality of Asynchronously Time-Divided Transmission Channels, a Flow of Data Cells, the State of a Counter Being Kept Up To Date in Accordance With the Number of Data Cells Per Unit of Time; Georg Daisenberger in U.S. Pat. No. 4,626,625 entitled Telecommunications System, Particularly a Telephone Exchange System, Having Overload Protected Sequential Logic Systems; Gerhafd Wegmann in U.S. Pat. No. 4,658,098 entitled Circuit Arrangement for Telecommunications Switching Systems, Particulaly Telephone Switching systtems, Comprising Information-Processing Central Switch Devices and Sub-Central Switching Facilities Which Supply the Same With Information; and Philip M. Williams in U.S. Pat. No. 5,450,483 entitled Method of Controlling Overloads in a Telecommunications Network.

SUMMARY OF THE INVENTION

Accordingly, it is an object of the present invention to provide a method of controlling an overload of a program.

It is another object of the present invention to provide a method of controlling the message overload of a program before the program receiving a plurality of messages requests a resource by an operating program.

It is further another object of the present invention to provide an overload control method preventing a fault due to a specific function request caused by a plurality of messages being simultaneously received by the program.

To achieve this and other objects, the present invention contemplates a method for a message overload of a program in a plural processor controlled system by receiving a function request message after setting a counting value for receiving a message, increasing a message counter by one every time the function request message is received and then obtaining a counted value by the message counter, comparing the counted value with a designated threshold value, performing a corresponding specific function to thereby carry out an added job when the counted value is equal to or less than the designated threshold value, and notifying a processor which requested the specific function of a job result, and informing the corresponding processor which requested the specific function of a process impossibility when the counted value is larger than the designated threshold value, thereby generating an alarm indicating an overload state.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENT

Figure 1:
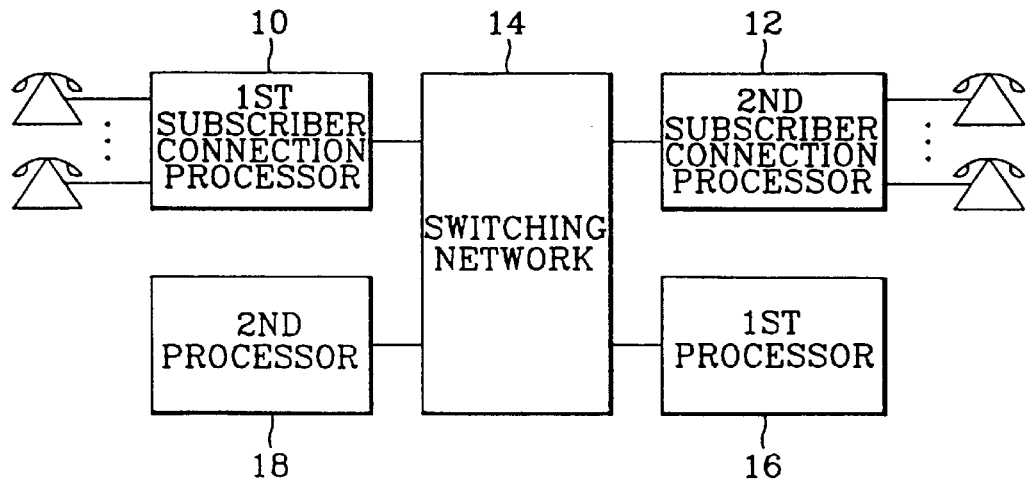
FIG. 1 is a block diagram illustrating a construction of a switching system having a plurality of multiprocessors.

FIG. 1 illustrates a construction of a telecommunications system having a plurality of processors incorporating a switching network 14 which is connected between a first subscriber connection processor 10 and a second subscriber connection processor 12, and further connected between a first processor 16 and a second processor 18. Calls to and from a plurality of subscribers are controlled by the first and second subscriber connection processors 10 and 12 connected thereto. The first and second processors 16 and 18 analyze calls from the subscribers to thereby process them or connect the calls to an additional service device. When a large number of function requests are simultaneously received by one of the first and second processors 16 and 18 from a plurality of subscribers, a system fault due to an overload may be generated in the processor requested by the function requests. An overload control involving operations controlling elements such as a processing power, a processing time, the number of processes that may be generated and the number of the messages capable of being processed, is carried out through a program of the operating system. Accordingly, it is possible to detect and control the overload of the processor, but it is difficult to prevent the overload state from arising. That is, when the program transmits the message or necessitates an operating process in order to process the function requested thereto, after the corresponding function is requested by the operating program and an entire resource is checked by the operating program, the result is notified, thereby performing the job. When the operating program receives the same request as a user program (i.e., single program), since the operating program and a user program are generally used without distinction for the same request, the resource of the operating program may be monopolized by the user program.

Figure 2:
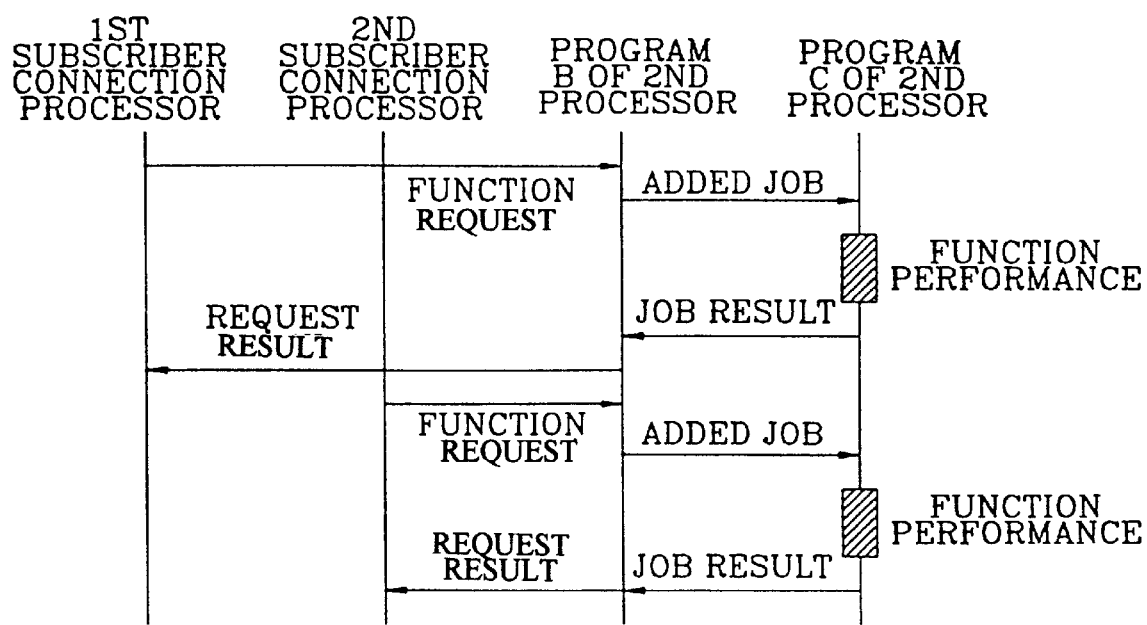
FIG. 2 is a flowchart illustrating a procedure of performing a general function request and controlling a request result of the system of FIG. 1.

In FIG. 1, when the specific function of second processor 18 is requested by a plurality of processors such as the first and the second subscriber connection processors 10 and 12 and the first processor 16, and assuming that a plurality of function request messages are received by second processor 18, performance of a separate child process, i.e., subroutine, and accessing of a data base are performed via a program C through a program B of second processor 18. The operations as mentioned above are usually performed in a call processing procedure. As shown in FIG. 2, when the function request is generated from one of the first and the second subscriber connection processors 10 and 12 or the first processor 16, program B of second processor 18 requests an additional job from program C, which performs functions such as the child process and the data base access, and notifies program B thereof of a job result. Then, program B of second processor 18 receives the job result and notifies one of the first and the second subscriber connection processors 10 and 12 or the first processor 16 of the result with respect to the function request.

When the function request is generated from one of the first and the second subscriber connection processors 10 and 12 or the first processor 16, and until the request result is received by the requesting first subscriber connection processor 10, second subscriber connection processor 12 or the first processor 16, second processor 18 monopolizes the resource of the operating program such as a process, a stack and the buffer and so on.

Second processor 18, however, also carries out the other programs besides programs B and C and therefore, when the operating program is monopolized by programs B and C, operation of the other programs within second processor 18 such as a fundamental function program of the system is limited. A fault by second processor 18 in performing one of the functions may be generated in the form of a call interrupt, a data discord, or a call impossibility, etc. A fault by second processor 18 also causes a problem in the corresponding programs of one of the first and second connection processors 10 and 12 or first processor 16 which did not receive the desired response after requesting the function from second processor 18.

Figure 3A:
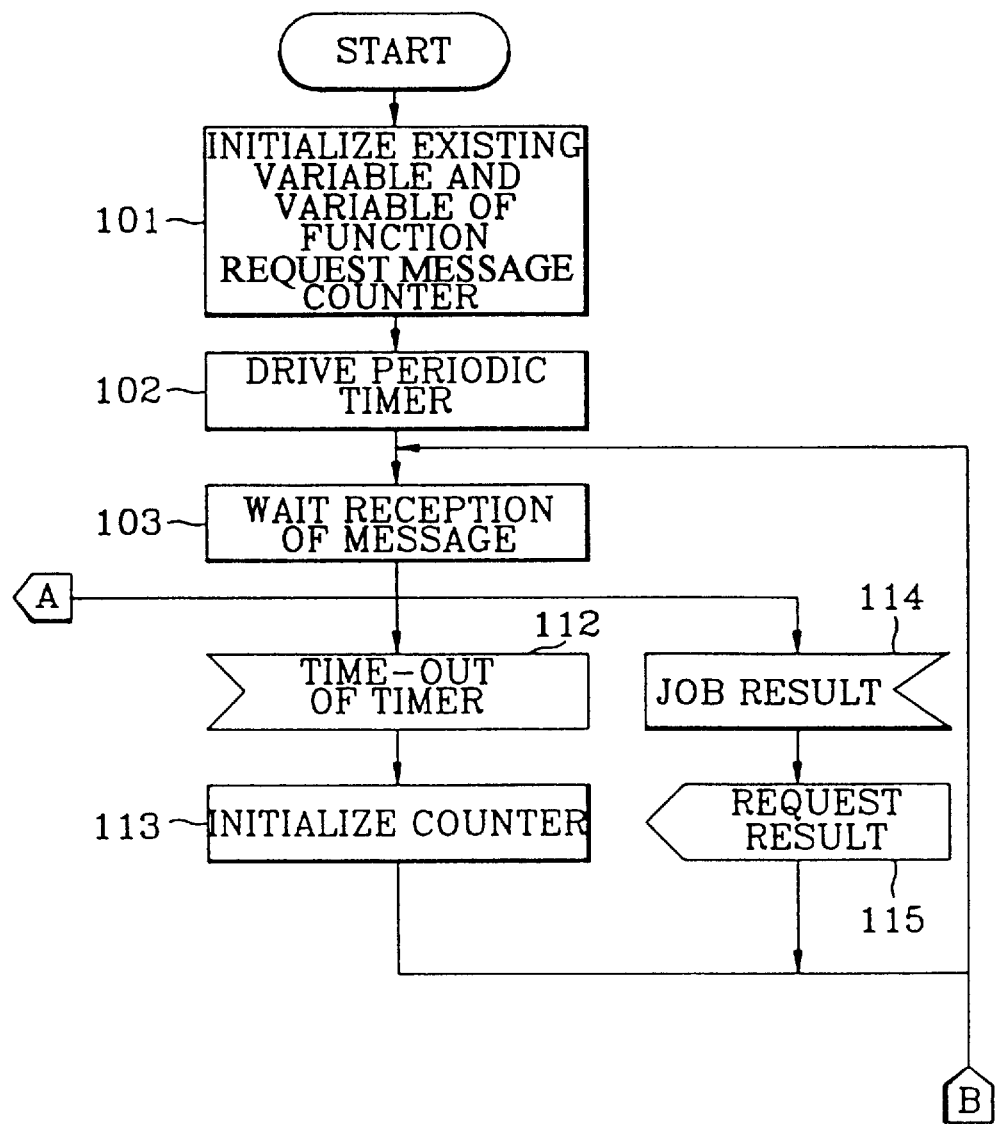
FIGS. 3A and 3B are flowcharts illustrating a method of controlling a message overload of the unit program before the unit program requests a resource to an operating program upon reception of a plurality of messages in accordance with the principles of the present invention.
Figure 3B:
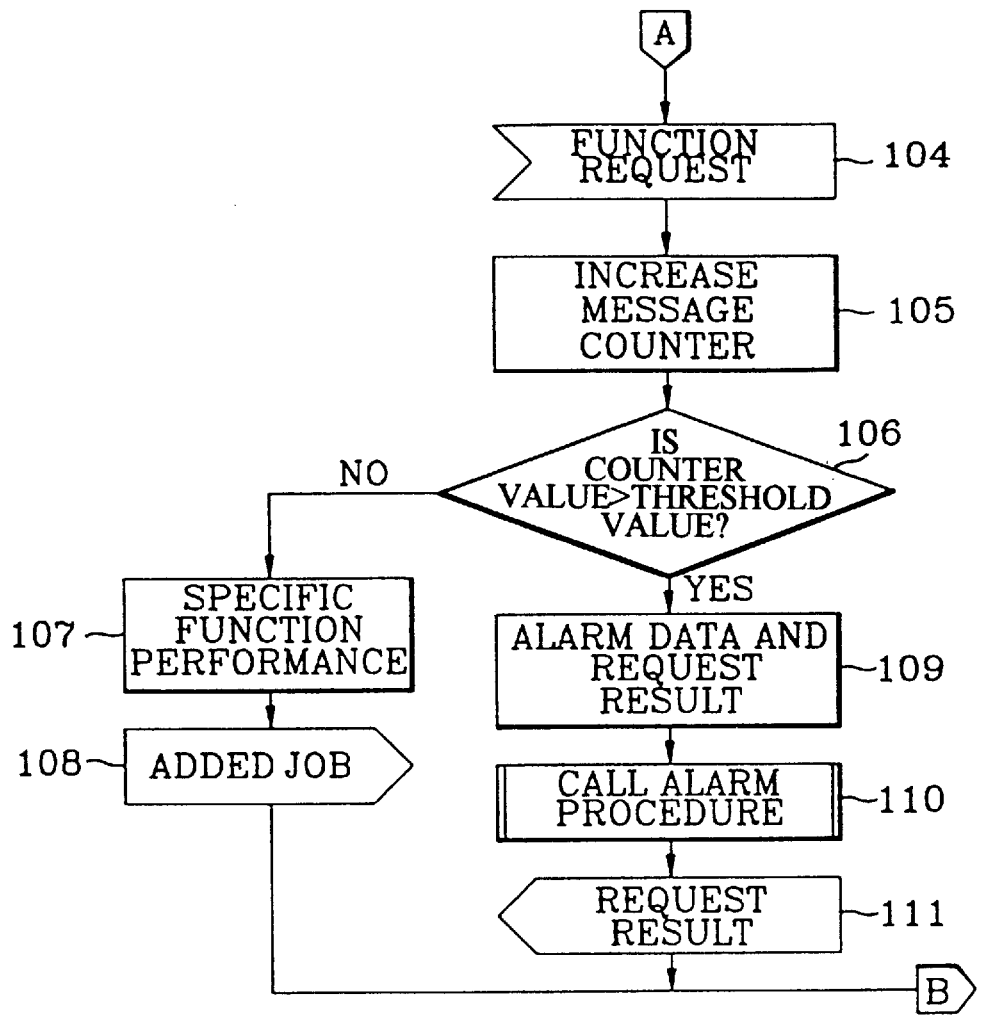

FIGS. 3A and 3B show a flowchart illustrating a process for controlling a message overload of a program before the program requests a resource in a operating program upon reception of a plurality of messages in accordance with the principles of the present invention.

Based upon the construction of a system as shown in FIG. 1, and with reference to FIG. 3, a preferred embodiment of the present invention is explained in detail with respect to second processor 18. Note that the steps performed by second processor 18 are also applicable to first processor 16.

In step 101, second processor 18 initializes various existing variables, including a function request message counter variable, when a program is initialized, and then proceeds to step 102. In step 102, second processor 18 sets a value of an internal periodic timer and drives the periodic timer. In step 103, second processor 18 enters a message reception waiting state until a message is recieved or until the time interval established by the value set during step 102 elapses. When a function request message from one of the first and second connection processors 10 and 12 or first processor 16, is received during the message reception waiting state, second processor 18 jumps to subroutine 104 for processing a function request and proceeds to step 105 wherein the value of the corresponding message counter is increased by one. In step 106, second processor 18 compares the value of the counter with a threshold value indicative of the number of jobs that can be processed in a unit of time and calculated based upon a processing speed of the corresponding processor. When the value of the counter is equal to or less than the threshold value, second processor 18 proceeds to step 107. In step 107, second processor 18 performs, by program B, the specific function requested by one of the first and second connection processors 10 and 12 or first processor 16. In step 108, program B of second processor 18 requests performance by program C of an additional job, and then returns to step 103 to thereby wait a job result message (step 114). When the counter value, step 106, is larger than the threshold value, second processor 18 proceeds to step 109 and records alarm data and the request result as a processing impossibility, and then proceeds to step 110. In step 110, second processor 18 calls an alarm procedure, thereby transmitting an alarm indicating that processor 18 cannot perform the process of program B, or program C, due to an overload. In step 111, second processor 18 notifies the requesting processor, i.e., first connection processor 10, second connection processor 12 or first processor 16, of the request result indicating the process impossibility of the requested function.

Additionally, in step 103, second processor 18 checks the timer during the message reception waiting state, and when a timer end message is received indicating the period set in the timer has timed out or elapsed, second processor 18 jumps to subroutine 112 for performing a time-out of timer process and proceeds to step 113. In step 113, second processor 18 initializes the message reception counter, and then returns to step 103.

During step 103, if there are a plurality of function request messages which are to be counted, the counter variable is increased by one in response to each separately received function request message. The configuration of the counter variable can be replaced by a relational data base as shown in Table 1, and an access and update thereto are based upon the data base system previously established in the system.

TABLE 1

| D-MSG-ID | D-CNT |
|----------|-------|
| XXX | 0 |
| YYY | 0 |

In the above Table, the D-MSG-ID represents a code for identifying messages required in the method of controlling the message overload, and the D-CNT is a reception message counter value assigned to the D-MSG-ID code by second processor 18. XXX and YYY represent messages, such as a timer time-out message or a request result message, that are received during message wait state 103 but are not assigned a count value. Accordingly, when a reception message counter value D-CNT reaches a predetermined value, second processor 18 will perform steps 109–111.

Furthermore, when second processor 18 performs the functions, steps 107 and 108, such as generation of the child process and data base access, etc., in the program C after receiving the job request from the program B, a job result message is generated from the program C. The process then returns to step 103 wherein the reult message is detected and second processor 18 jumps, step 114, to the job result subroutine. At this time, program B of the second processor 18 receives the job result from the program C and notifies, step 115, the corresponding processor which requested the function, i.e., first connection processor 10, second connection processor 12 or first processor 16, of the result for the corresponding function request, and returns to the message waiting state of step 103.

In the present invention as discussed above, second processor 18 sets a counting value for counting received function request messages and then, increases the counter by one upon reception of the function request message. Then, when the value of the counter is equal to or less than a threshold value, second processor 18 performs the corresponding specific function to thereby perform an additional job, and notifies the function requesting processor of the job result. Contrarily, when the value of the counter is larger than the threshold value, second processor 18 notifies the function requesting processor with a request result indicating an overload state of the corresponding program and accordingly, the operating program resource can be prevented from being wasted due to the added job by the function performance. Moreover, since it can be prevented that the processor is monopolized by a specific program, processing efficiency can be promoted and the operation state of the processor can be easily checked through the alarm of the program without the need for a specific command.

What is claimed is:

1. A method of controlling a message overload of a program in a plural processor controlled switching system, comprising the steps of:

setting a count value, indicative of received function request messages, to an initial value;

receiving a function request message transmitted from a processor and increasing said count value by one;

comparing said count value to a predetermined threshold value;

performing a corresponding specific function in response to said function request message, when said count value is less than or equal to the threshold value in said comparing step;

performing an additional job at a request by said specific function and generating a job result message upon completion of said additional job;

transmitting to said processor a job result corresponding to said function request message in response to said job result message; and determining an existence of an overload state when said count value is larger than said threshold value in said comparing step and notifying said processor of said overload state.

2. The method as set forth in claim 1, further comprising the steps of:

driving a periodic timer for a time period according to a set time value;

waiting for reception of a message during said time period; and increasing said count value by one for every function request message received during said time period and then performing said comparing step.

3. The method as set forth in claim 2, further comprising the steps of:

generating a time-out message when said time period elapses an no message has been received during said step of waiting for reception of a message;

re-initializing said count value to said initial value when said time period elapses; and returning to said step of waiting for reception of a message.

4. The method as set forth in claim 2, further comprising the steps of:

performing said step of transmitting said job result to said processor when said job result message is received during said step of waiting for reception of a message; and returning to said step of waiting for reception of a message.

5. The method as set forth in claim 1, further comprising the steps of:

generating alarm data when said overload state is determined;

transmitting an alarm indicating said corresponding specific function cannot be performed; and transmitting, to said processor, a request result indicating that said specific function cannot be performed.

6. A method of controlling a message overload of a program in one processor of a plurality of processors in a plural processor controlled switching system, comprising the steps of:

setting a count value to an initial value;

driving a periodic timer for a time period according to a set time value;

waiting for reception of a message during said time period; and increasing said count value by one upon receipt of a function request message received from another processor of said plurality of processors during said waiting step;

comparing said count value to a predetermined threshold value;

performing a corresponding specific function in response to said function request message, when said count value is less than or equal to the threshold value in said comparing step;

generating a job result message upon completion of said corresponding specific function;

transmitting to said another processor a first request result, said first request corresponding to said function request message in response to said job result message, when said job result message is generated during said waiting step;

determining an existence of an overload state when said comparing step determines that count value is larger than said threshold value;

generating alarm data when said overload state is determined;

transmitting, to said another processor, a second request result, said second request result indicating that said specific function cannot be performed; and returning to said waiting step after transmitting said first or second request results to said another processor.

7. The method as set forth in claim 6, further comprising the steps of:

generating a time-out message when said time period elapses an no message has been received during said waiting step;

re-initializing said count value to said initial value when said time period elapses; and returning to said waiting step.

* * * * *